(12) United States Patent
Meler

(10) Patent No.: US 10,033,928 B1
(45) Date of Patent: Jul. 24, 2018

(54) APPARATUS AND METHODS FOR ROLLING SHUTTER COMPENSATION FOR MULTI-CAMERA SYSTEMS

(71) Applicant: GOPRO, INC., San Mateo, CA (US)

(72) Inventor: Antoine Meler, Chapareillan (FR)

(73) Assignee: GoPro, Inc., San Mateo, CA (US)

( * ) Notice: Subject to any disclaimer, the term of this patent is extended or adjusted under 35 U.S.C. 154(b) by 281 days.

(21) Appl. No.: 14/927,343

(22) Filed: Oct. 29, 2015

(51) Int. Cl.
| | |
|---|---|
| *H04N 5/00* | (2011.01) |
| *H04N 5/232* | (2006.01) |
| *G06T 3/00* | (2006.01) |
| *G02B 13/06* | (2006.01) |
| *H04N 5/374* | (2011.01) |
| *H04N 7/18* | (2006.01) |

(52) U.S. Cl.
CPC .......... *H04N 5/2329* (2013.01); *G02B 13/06* (2013.01); *G06T 3/0018* (2013.01); *H04N 5/23238* (2013.01); *H04N 5/374* (2013.01); *H04N 7/181* (2013.01)

(58) Field of Classification Search
CPC .................................................. H04N 5/2329
USPC ........................................................... 348/36
See application file for complete search history.

(56) References Cited

U.S. PATENT DOCUMENTS

| | | |
|---|---|---|
| 5,260,779 A | 11/1993 | Wasserman |
| 5,555,895 A | 9/1996 | Ulmer |

(Continued)

FOREIGN PATENT DOCUMENTS

| | | |
|---|---|---|
| EP | 0605045 A1 | 7/1994 |
| EP | 0650299 A1 | 4/1995 |

(Continued)

OTHER PUBLICATIONS

Mia Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

(Continued)

*Primary Examiner* — Chikaodili E Anyikire
*Assistant Examiner* — Shanika Brumfield
(74) *Attorney, Agent, or Firm* — Sheppard Mullin Richter & Hampton LLP

(57) ABSTRACT

Images may be obtained using a moving camera comprised of two or more rigidly mounted image sensors. Camera motion may change camera orientation when different portions of an image are captured. Pixel acquisition time may be determined based on image exposure duration and position of the pixel in the image array (pixel row index). Orientation of the sensor may at the pixel acquisition time instance may be determined. Image transformation may be performed wherein a given portion of the image may be associated with a respective transformation characterized by the corrected sensor orientation. In some implementations of panoramic image acquisition, multiple source images may be transformed to, e.g., equirectangular plane, using sensor orientation that is corrected for the time of pixel acquisition. Use of orientation correction may improve quality of stitching by, e.g., reducing contrast of border areas between portions of the transformed image obtained by different image sensors.

20 Claims, 7 Drawing Sheets

(56) References Cited

U.S. PATENT DOCUMENTS

| | | | |
|---|---|---|---|
| 6,434,265 B1* | 8/2002 | Xiong | G06K 9/32 |
| | | | 382/154 |
| 6,486,908 B1 | 11/2002 | Chen | |
| 6,710,740 B2 | 3/2004 | Needham | |
| 6,711,293 B1 | 3/2004 | Lowe | |
| 6,788,333 B1* | 9/2004 | Uyttendaele | H04N 5/23238 |
| | | | 348/36 |
| 7,057,663 B1 | 6/2006 | Lee | |
| 7,403,224 B2* | 7/2008 | Fuller | G06F 17/30247 |
| | | | 348/231.3 |
| 7,983,502 B2 | 7/2011 | Cohen | |
| 8,194,993 B1* | 6/2012 | Chen | G06T 5/006 |
| | | | 348/231.6 |
| 8,411,166 B2 | 4/2013 | Miyata | |
| 8,606,073 B2 | 12/2013 | Woodman | |
| 8,670,030 B2 | 3/2014 | Tanaka | |
| 8,842,197 B2* | 9/2014 | Singh | G06F 17/30265 |
| | | | 348/231.3 |
| 8,890,954 B2 | 11/2014 | O'Donnell | |
| 8,896,694 B2 | 11/2014 | O'Donnell | |
| 9,019,396 B2* | 4/2015 | Kiyoshige | H04N 5/262 |
| | | | 348/231.3 |
| 9,158,304 B2 | 10/2015 | Fleck | |
| 9,204,041 B1* | 12/2015 | Campbell | H04N 13/0296 |
| 9,342,534 B2 | 5/2016 | Singh | |
| 9,409,646 B2 | 8/2016 | Fleck | |
| 9,473,758 B1 | 10/2016 | Long | |
| 9,602,795 B1 | 3/2017 | Matias | |
| 2002/0090143 A1* | 7/2002 | Endo | G06T 1/00 |
| | | | 382/282 |
| 2002/0112005 A1 | 8/2002 | Namias | |
| 2002/0122113 A1* | 9/2002 | Foote | G06T 3/4038 |
| | | | 348/48 |
| 2002/0191087 A1 | 12/2002 | Hashimoto | |
| 2003/0085992 A1 | 5/2003 | Arpa | |
| 2003/0098954 A1 | 5/2003 | Amir | |
| 2003/0160862 A1 | 8/2003 | Charlier | |
| 2004/0010804 A1 | 1/2004 | Hendricks | |
| 2004/0021780 A1 | 2/2004 | Kogan | |
| 2004/0047606 A1 | 3/2004 | Mikawa | |
| 2004/0075738 A1 | 4/2004 | Burke | |
| 2004/0135900 A1 | 7/2004 | Pyle | |
| 2004/0169724 A1 | 9/2004 | Ekpar | |
| 2005/0033760 A1 | 2/2005 | Fuller | |
| 2005/0062869 A1 | 3/2005 | Zimmermann | |
| 2005/0104976 A1 | 5/2005 | Currans | |
| 2005/0134707 A1 | 6/2005 | Perotti | |
| 2005/0289111 A1 | 12/2005 | Tribble | |
| 2006/0050997 A1 | 3/2006 | Imamura | |
| 2007/0030358 A1 | 2/2007 | Aoyama | |
| 2007/0053659 A1 | 3/2007 | Kiyama | |
| 2007/0081091 A1* | 4/2007 | Pan | A61B 1/00165 |
| | | | 348/335 |
| 2007/0120986 A1 | 5/2007 | Nunomaki | |
| 2007/0140662 A1 | 6/2007 | Nunomaki | |
| 2007/0300249 A1 | 12/2007 | Smith | |
| 2008/0094499 A1 | 4/2008 | Ueno | |
| 2008/0118100 A1 | 5/2008 | Hayashi | |
| 2009/0210707 A1 | 8/2009 | De Lutiis | |
| 2009/0251558 A1 | 10/2009 | Park | |
| 2009/0262206 A1 | 10/2009 | Park | |
| 2009/0271447 A1 | 10/2009 | Shin | |
| 2010/0045773 A1 | 2/2010 | Ritchey | |
| 2010/0097443 A1* | 4/2010 | Lablans | G03B 37/00 |
| | | | 348/36 |
| 2010/0238304 A1 | 9/2010 | Miyata | |
| 2010/0250022 A1 | 9/2010 | Hines | |
| 2010/0289924 A1 | 11/2010 | Koshikawa | |
| 2010/0299630 A1 | 11/2010 | McCutchen | |
| 2011/0013778 A1 | 1/2011 | Takumai | |
| 2011/0115883 A1* | 5/2011 | Kellerman | G06F 3/012 |
| | | | 348/46 |
| 2011/0141300 A1* | 6/2011 | Stec | G06T 3/4038 |
| | | | 348/222.1 |
| 2011/0261227 A1* | 10/2011 | Higaki | G03B 17/24 |
| | | | 348/231.5 |
| 2012/0206565 A1 | 8/2012 | Villmer | |
| 2012/0242798 A1 | 9/2012 | Mcardle | |
| 2012/0293607 A1* | 11/2012 | Bhogal | G06T 3/4038 |
| | | | 348/36 |
| 2013/0021450 A1 | 1/2013 | Yoshizawa | |
| 2013/0058532 A1 | 3/2013 | White | |
| 2013/0058619 A1 | 3/2013 | Miyakawa | |
| 2013/0127903 A1 | 5/2013 | Paris | |
| 2013/0176403 A1 | 7/2013 | Varga | |
| 2013/0177168 A1 | 7/2013 | Inha | |
| 2013/0182177 A1 | 7/2013 | Furlan | |
| 2013/0210563 A1* | 8/2013 | Hollinger | H04N 5/2252 |
| | | | 473/570 |
| 2013/0235226 A1 | 9/2013 | Karn | |
| 2014/0037268 A1 | 2/2014 | Ryota | |
| 2014/0039884 A1 | 2/2014 | Chen | |
| 2014/0240122 A1 | 8/2014 | Roberts | |
| 2015/0055937 A1 | 2/2015 | Van Hoff | |
| 2015/0058102 A1* | 2/2015 | Christensen | G11B 27/11 |
| | | | 705/14.6 |
| 2015/0142211 A1 | 5/2015 | Shehata | |
| 2015/0142742 A1 | 5/2015 | Hong | |
| 2015/0166476 A1 | 6/2015 | Chen | |
| 2015/0186073 A1 | 7/2015 | Pacurariu | |
| 2015/0189221 A1 | 7/2015 | Nakase | |
| 2015/0287435 A1 | 10/2015 | Land | |
| 2015/0288754 A1 | 10/2015 | Mosko | |
| 2015/0304532 A1 | 10/2015 | Bart | |
| 2015/0336015 A1 | 11/2015 | Blum | |
| 2015/0350614 A1 | 12/2015 | Meier | |
| 2015/0363648 A1 | 12/2015 | Li | |
| 2015/0367958 A1* | 12/2015 | Lapstun | B64D 47/08 |
| | | | 348/144 |
| 2015/0370250 A1 | 12/2015 | Bachrach | |
| 2016/0005435 A1 | 1/2016 | Campbell | |
| 2016/0018822 A1 | 1/2016 | Nevdahs | |
| 2016/0031559 A1 | 2/2016 | Zang | |
| 2016/0054737 A1 | 2/2016 | Soll | |
| 2016/0076892 A1 | 3/2016 | Zhou | |
| 2016/0098469 A1 | 4/2016 | Allinson | |
| 2016/0101856 A1 | 4/2016 | Kohstall | |
| 2016/0112713 A1* | 4/2016 | Russell | H04N 19/20 |
| | | | 375/240.03 |
| 2016/0129999 A1 | 5/2016 | Mays | |
| 2016/0139596 A1 | 5/2016 | Na | |
| 2016/0139602 A1 | 5/2016 | Kohstall | |
| 2016/0165563 A1 | 6/2016 | Jang | |
| 2016/0179096 A1 | 6/2016 | Bradlow | |
| 2016/0189101 A1 | 6/2016 | Kantor | |
| 2016/0234438 A1 | 8/2016 | Satoh | |
| 2016/0239340 A1 | 8/2016 | Chauvet | |
| 2016/0269621 A1 | 9/2016 | Cho | |
| 2016/0295108 A1* | 10/2016 | Cao | H04N 5/23238 |
| 2016/0304198 A1 | 10/2016 | Jourdan | |
| 2016/0306351 A1 | 10/2016 | Fisher | |
| 2016/0313734 A1 | 10/2016 | Enke | |
| 2016/0327950 A1 | 11/2016 | Bachrach | |
| 2016/0336020 A1 | 11/2016 | Bradlow | |
| 2016/0366290 A1 | 12/2016 | Hoshino | |

FOREIGN PATENT DOCUMENTS

| | | |
|---|---|---|
| EP | 0661672 A1 | 7/1995 |
| WO | 2009047572 A1 | 4/2009 |
| WO | 2014090277 A1 | 6/2014 |

OTHER PUBLICATIONS

Ryan Jackson: 'Shooting 360-degree video with four GoPro HD Hero cameras / Ryan Jackson Photography' 8 fvrier 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

PCT International Search Report for PCT/EP2014/061897 dated Sep. 15, 2014, 3 pages.

(56) References Cited

OTHER PUBLICATIONS

PCT International Search Report for PCT/EP2014/058008 dated May 26, 2014, 3 pages.
Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, 30 juillet 2000 (Jul. 30, 2000), pp. 1419-1422, XP010512772, DOI: 10.1109/ICME.2000.871033 ISBN: 978-0-7803-6536-0.
Hossein Afshari et al: "The Panoptic Camera: A Plenoptic Sensor with Real-Time Omnidirectional Capability", Journal of Signal Processing Systems, vol. 70, No. 3, 14 mars 2012 (Mar. 14, 2012), pp. 305-328, XP055092066, ISSN: 1939-8018, DOI: 10.1007/s11265-012-0668-4.
Benjamin Meyer et al: "Real-time Free-Viewpoint Navigation from Compressed Multi-Video Recordings", Proc. 3D Data Processing, Visualization and Transmission (3DPVT), 31 mai 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].
Lipski, C.: "Virtual video camera", SIGGRAPH '09: Posters on, SIGGRAPH '09, vol. 0, 1 janvier 2009 (Jan. 1, 2009), pp. 1-1, XP055091257, New York, New York, USA DOI: 10.1145/1599301.1599394.
Felix Klose et al: "Stereoscopic 3D View Synthesis From Unsynchronized Multi-View Video", Proc. European Signal Processing Conference (EUSIPCO), Barcelona, Spain, 2 septembre 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].
PCT International Search Report for PCT/EP2014/057352 dated Jun. 27, 2014, 3 pages.
Farin et al., "Shortest Circular Paths on Planar Graphs," In 27th Symposium on Information Theory in the Benelux 2006, 8 pgs.
Zhi et al., "Toward Dynamic Image Mosaic Generation With Robustness to Parallax," IEEE Transactions on Image Processing, vol. 21, No. 1, Jan. 2012, ppp. 366-378.
Perazzi et al., "Panoramic Video from Unstructured Camera Arrays," Eurographics, vol. 34 (2015), No. 2, 12 pgs.
U.S. Appl. No. 14/920,427, filed Oct. 22, 2015, entitled "Apparatus and Methods for Embedding Metadata Into Video Stream" 62 pages.
U.S. Appl. No. 14/949,786, filed Nov. 23, 2015, entitled "Apparatus and Methods for Image Alignment" 67 pages.
U.S. Appl. No. 14/927,343, filed Oct. 29, 2015, entitled "Apparatus and Methods for Rolling Shutter Compensation for Multi-Camera Systems" 45 pages.
U.S. Appl. No. 15/001,038, filed Jan. 19, 2016, entitled "Metadata Capture Apparatus and Methods" 54 pages.
"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkelev.edu/spatialaudiolectures>.
O'Donovan, A., et al., "Real Time Capture of Audio Images and their Use with Video," 2007 IEEE Workshop on Applications of Signal Processing to Audio and Acoustics, Oct. 21-24, 2007, pp. 10-13.
O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.
PCT International Search Report and Written Opinion for PCT/US15/38913, dated Sep. 29, 2015, 15 Pages.

* cited by examiner

APPARATUS AND METHODS FOR ROLLING SHUTTER COMPENSATION FOR MULTI-CAMERA SYSTEMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates generally to processing of images collected with multiple cameras and more particularly in one exemplary aspect to computer apparatus and methods for rolling shutter correction when constructing panoramic image from images captured with multiple cameras.

Description of Related Art

Image transformation, image combining, and/or image stitching may be employed when producing an image characterized by, e.g., a wider field of view compared to one or more source images. In order to reduce pixel mismatch, particularly along borders of two or more source images of a video being stitched together, the source images may be synchronized. When using images captured with CMOS sensors and/or other sensors, frame-level synchronization may not be sufficient.

SUMMARY

The present disclosure satisfies the foregoing needs by providing, inter alia, apparatus and methods for rolling shutter correction when constructing panoramic image from images captured with multiple cameras. In one aspect of the disclosure, a computerized system is provided for obtaining composite images. The system may include one or more of a processor, and/or other components. The processor may be adapted to execute a plurality of computer instructions.

The processor may be adapted to obtain component images. The component images may include a first component image and a second component image. The first component image may be comprised of a first plurality of pixels captured by a first imaging sensor, and the second component image may be comprised of a second plurality of pixels captured by a second imaging sensor. In some implementations, the first imaging sensor may comprise an array of rows of photosites. The array of rows of photosites may be configured based on a CMOS imaging process wherein time of acquiring content of a given row of photosites of the array may be delayed relative to a time instance of acquiring content of another row of photosites of the array.

The processor may be adapted to generate a first composite image by performing a first transformation operation on the component images, including the first component image and the second component image. In some implementations, the system may include a first lens. The first lens may be configured to provide light waves to the first imaging sensor. The first lens may be characterized by a first lens projection, and the first transformation operation may be configured based on an inverse of the first lens projection. In some implementations, the system may include a second lens. The second lens may be configured to provide light waves to the second imaging sensor. The second lens may be characterized by a second lens projection, and the first transformation operation may be configured based on an inverse of the second lens projection. In some implementations, the first component image may be configured based on the first lens projection and the first composite image may be configured in an equirectangular projection. In some implementations, the first transformation may be configured to transform the first component image and the second component image into equirectangular plane. In some implementations, the first lens projection may be characterized by a rectilinear transformation. In some implementations, the first lens projection may be characterized by a wide angle fish eye transformation such that a first lens field of view may be characterized by a first cardinal dimension configured in excess of 120 degrees of arc and a second cardinal dimension configured in excess of 90 degrees of arc. In some implementations, the first imaging sensor may be disposed in a plane configured perpendicular to plane of the second imaging sensor, and the second lens projection may configured based on the wide angle fish eye transformation such that a second lens field of view may be characterized by the second cardinal dimension and the first cardinal dimension. In some implementations, the first lens field of view and the second lens field of view may comprise an overlapping portion such that pixels of the first component image corresponding to the overlapping portion and pixels of the second component image corresponding to the overlapping portion are transformed into pixels of an overlapping area within the first composite image.

The processor may be adapted to, for pixels in the first composite image, determine corresponding rows in the component images such that for a first set of pixels in the first composite image a first row of the first component image is determined to be corresponding, and for a second set of pixels in the first composite image a second row of the second component image is determined to be corresponding. In some implementations, the determination of the corresponding rows in the component images may be configured based on an iteration process such that for a given iteration, a first instance of the corresponding first row of the first component image may be determined based on a second instance of the corresponding first row of the first component image determined at another iteration preceding the given iteration.

The processor may be adapted to determine acquisition times associated with row locations corresponding to pixels in the first composite image such that a first acquisition time may be determined for the first row of the first component image and a second acquisition time may be determined for the second row of the second component image.

The processor may be adapted to determine imaging sensor orientations based on the acquisition times and orientation information such that a first orientation is determined for the first imaging sensor based on the first acquisition time and a second orientation is determined for the second sensor based on the second acquisition time. In some implementations, the first imaging sensor may be configured to obtain the first component image at a first time instance and a third component image at a second time instance prior to the first time instance. The orientation information may be obtained based on an analysis of the first component image and the third component image. In some implementations, a sensor interface may be configured to obtain the orientation information. In some implementations, the sensor interface may be configured to be coupled to an orientation sensor. The orientation sensor may comprise one or more of a gyroscope, accelerometer, and/or other orientation sensors. In some implementations, the system may include a support structure. The support structure may be configured to support the first imaging sensor. The support structure may be configured to support the second imaging sensor at a given orientation relative to the first imaging sensor. In some implementations, the system may include an orientation sensor. The orientation sensor may be configured to obtain an orientation of the support structure. In some implementations, the orientation information may be configured based on an orientation of the first imaging sensor and an orientation of the second imaging sensor relative to the support structure, and the orientation of the support structure The processor may be adapted to perform a second transformation operation on the component images including the first component image and the second component image to generate a second composite image. Such transformation operation may include application of the first orientation and the second orientation. In some implementations, the first composite image may be characterized by a first performance metric and the second composite image may be characterized by a second performance metric. In some implementations, the step of applying of the first orientation and the second orientation to the second transformation operation may be configured to improve the second performance metric relative the first performance metric.

In one aspect of the disclosure, a computer implemented method is provided for improving quality of a digital panorama image obtained based on stitching of source digital images. The method may include, for a portion of the digital panorama image, determining a corresponding location in at least one of the source digital images. The method may include determining an acquisition time corresponding to a time of a portion of the at least one source digital image associated with the corresponding location acquired by an image sensor. The at least one source digital image may be obtained by the image sensor. The method may include determining an orientation of the image sensor associated with the acquisition time. The method may include performing a stitching operation, configured to transform portion of the at least one source digital image associated with the corresponding location from coordinate representation of the image sensor into coordinate representation of the digital panorama image. The transform may be configured based on the orientation. The quality of the digital panorama image obtained based on the orientation may be improved when compared to another quality of another digital panorama image obtained at a nominal sensor orientation.

In some implementations, the image sensor is configured to change its orientation during the acquisition of the at least one source digital image, and the nominal sensor orientation may be maintained at a given orientation during the acquisition of the at least one source digital image. In some implementations, the portion of the at least one source digital image may be configured to be captured by the image sensor at a first time instance, and another portion of the source digital image may be configured to be captured by the image sensor at a second time instance. The second time instance may be spaced by a delay interval from the first time instance, and the delay interval may be selected from a range between 5 microseconds and 1000 microseconds. In some implementations, the at least one source digital image may include multiple rows of pixels. The image sensor may comprise a CMOS image sensor configured to acquire a given row of pixels of the multiple rows of pixels at a given time. The digital panorama image may include multiple pixels. The portion of the digital panorama image may correspond to at least one pixel of the multiple pixels. The portion of the at least one source digital image may correspond to a row of the multiple rows of pixels, and the corresponding location may correspond to an index of the row within the multiple rows of pixels of the at least one source digital image.

In one aspect of the disclosure, a non-transitory computer readable medium with computer instructions is provided. The plurality of computer instructions may be configured to, when executed by a processor, produce a composite panoramic image in a panoramic image plane from first and second source images comprised of rows of pixels. The computer instructions may include one or more instructions, for a location in the panoramic image plane, to determine corresponding rows in the source images such that a corresponding first row of pixels in the first source image and a corresponding second row of pixels of the second source image are determined. The computer instructions may include one or more instructions to determine acquisition times associated with the rows such that a first acquisition time is determined for the first row of pixels in the first source image and a second acquisition time is determined for the second row pixels in the second source image. The computer instructions may include one or more instructions to determine sensor orientations based on the acquisition times and orientation information such that a first sensor orientation is determined for a first sensor at the first acquisition time and a second sensor orientation is determined for a second sensor at on the second acquisition time. The computer instructions may include one or more instructions to apply the first sensor orientation and the second sensor orientation to a transformation operation to obtain the composite panoramic image based on the transformation operation of the first source image and the second source image, and the first sensor orientation and the second sensor orientation.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
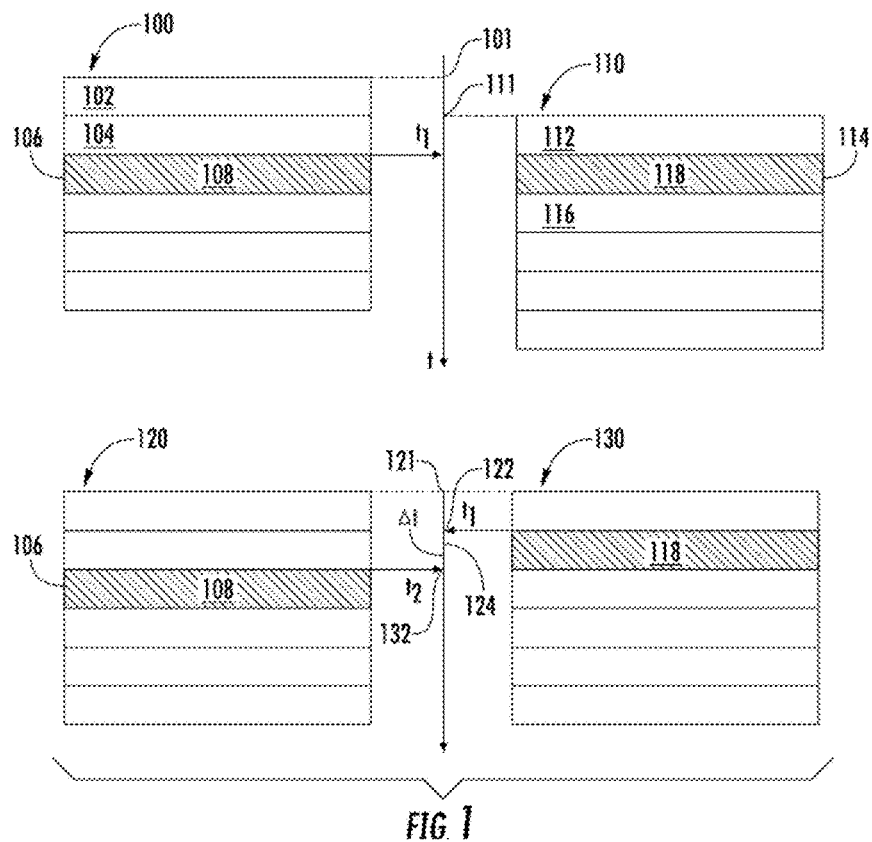
FIG. 1 is a functional block diagram illustrating a timing delay associated with a row-by-row scan of a CMOS imaging system in accordance with one implementation.

All Figures disclosed herein are © Copyright 2015 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

Apparatus and methods for image correction due to rolling shutter. Images may be obtained using a moving camera comprised of two or more rigidly mounted image sensors. Images acquired with CMOS sensors may comprise pixels acquired at different moments in time. A CMOS sensor may comprise an array of rows of photosites. Contents of photosites in the CMOS array may be sampled (acquired) on a row-by row basis so that contents of a row of photosites may be acquired after a time delay relative acquisition of contents a another row of photosites within the array. Camera motion may cause changes in camera orientation when different portions (e.g., different rows) of an image are captured. Pixel acquisition time may be determined based on image exposure duration and position of the pixel in the image array (pixel row index). Orientation of the sensor at the pixel acquisition time instance may be determined. Camera apparatus may comprise an orientation sensor (IMU) configured to provide orientation information. Image transformation may be performed wherein a given portion of the image may be associated with a respective transformation characterized by the corrected sensor orientation. In some implementations of panoramic image acquisition, multiple source images may be transformed to, e.g., equirectangular plane, using sensor orientation that is corrected for the time of pixel acquisition. Use or orientation correction may improve quality of stitching by, e.g., reducing contrast of border areas between portions of the transformed image obtained by different image sensors.

Active pixel sensors (APS) may be used for capturing images. Such image sensors may be produced by a complementary metal-oxide-semiconductor (CMOS) a technology for constructing integrated circuits and hence may be referred to as the CMOS image sensor. An image sensor may typically capture an image over a time window configured between approximately 4 ms and 1000 ms, depending exposure and/or image frame rate. During capture, the CMOS sensor performs row-by-row capture wherein a given row of pixels of the image may be sampled at a given time. The row-to-row delay may result in a "rolling shutter" effect, where objects in the resultant image may be skewed (tilted to the left or right, depending on the direction of camera or subject movement). For example, when tracking a car moving at high speed, the car may not appear to be distorted but the background may appear to be tilted. Furthermore, when using source images from multiple sensors in order to obtain a combined target image, source image pixel positions (e.g., along borders) may be corrected in order to compensate for potential distortions due to rolling shutter effect.

It will be recognized by those skilled in the arts that while certain aspects of the technology are described for images obtained by traditional CMOS sensors, characterized by row-by-row image acquisition process, methodology described herein may be applicable to other sensor technologies and/or to other image configurations. By way of a non-limiting illustration, an image sensor device may comprise two or more components wherein the first image sensor component may sense incoming waves (e.g., light, radio frequency waves, pressure waves) at a first time instance, while the second image sensor component may sense the incoming waves at a second time instance, e.g., subsequent to the first time instance. For example, an image sensor may comprise two CCD components (e.g., one covering one (e.g., left) portion of a view field and one covering another (e.g., right) portion of the view) configured to acquire pixels at two time instances (e.g., first pixels of one CCD sensor and subsequently pixels of the other CCD). Methodology of the present disclosure may be used to combine component images provided by the two CCD sensors while accounting for potential sensor motion during acquisition of the component images. In some implementations, a CMOS sensor may be configured to acquire (scan) a portion of an image at a given time. The image portion may include multiple pixels arranges in a variety of configurations, e.g., multiple rows, partial row, polygon, frame-like, and/or other shapes.

FIG. 1 illustrates a timing delay associated with a row-by-row scan of a CMOS imaging system in accordance with one implementation. An object may be imaged by two or more cameras. Individual cameras (e.g., cameras 200, 220 in FIG. 2) may be characterized by a respective field of view. Panels 100, 110 in FIG. 1 illustrate images of an object (horizontal bar) obtained with individual cameras (e.g., 200, 220 in FIG. 2, respectively). The image 100 may comprise representation 108 of the object, the image 110 may comprise representation 118 of the object. The representation 108 may correspond to row denoted 106 in image 100, the representation 118 may correspond to row denoted 114 in image 110. As illustrated in FIG. 1, the row 106 may occur (e.g., be sampled) subsequent to the row 114 relative frame start time (e.g., point in time denoted 101, 111 in FIG. 1). Panels 120, 130 illustrate images 100, 110 referenced relative a given point in time (e.g., denoted 121). Image configuration referenced to a given point in time Panel representation 120, 130 may be referred to as frame synchronized. When images are obtained using an image sensor that may capture one row of pixels in a given moment, row-to-row delay may be determined for matching pixels from two or more images when, e.g., stitching.

As illustrated in FIG. 1, in image 120, the object representation 108 may correspond to pixels acquired at time instant t2 (denoted 132), in image 130, the object representation 118 may correspond to pixels acquired at time instant t1 (denoted 122). Time difference dT, denoted 124 in FIG. 1, may be referred as the row-to-row delay. The row-to-row delay may be counted for in order to improve alignment between pixels of two or more images during construction of a combined image (e.g., image stitching).

Figure 2:
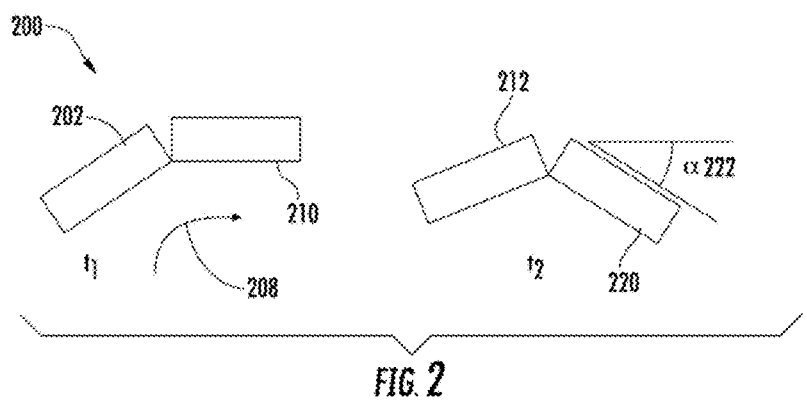
FIG. 2 is a functional block diagram illustrating a geometry of two-sensor imaging system in accordance with one implementation.

FIG. 2 illustrates geometry of two-sensor imaging system in accordance with one implementation. The system 200 may comprise image sensor 202 disposed at a given orientation with respect to image sensor 210. Sensors 202, 210 may form a sensor array. At time t1 (e.g., point in time 132 in FIG. 1), the images system may be disposed at a first orientation (also referred to as a reference orientation, denoted by line 206 in FIG. 2). During time interval 124 the system 200 may undergo a displacement. In some implementations, the displacement may comprise rotation component, denoted by arrow 208 in FIG. 2. At time t2 (e.g., point in time 122 in FIG. 1), the images system may be disposed at a second orientation that may differ from the reference orientation. The system 200 orientation change between time instant t1 and time instant t2 is denoted by angle 222 in FIG. 2. As may be seen from FIGS. 1-2, even when two captured videos and/or images may be synchronized at a frame level (e.g., panels 120, 130 in FIG. 1), row delay caused by row at a time image acquisition may cause mismatch between pixels of two or more images, particularly when the images and/or videos may be a captured by a moving sensor array.

Figure 3A:
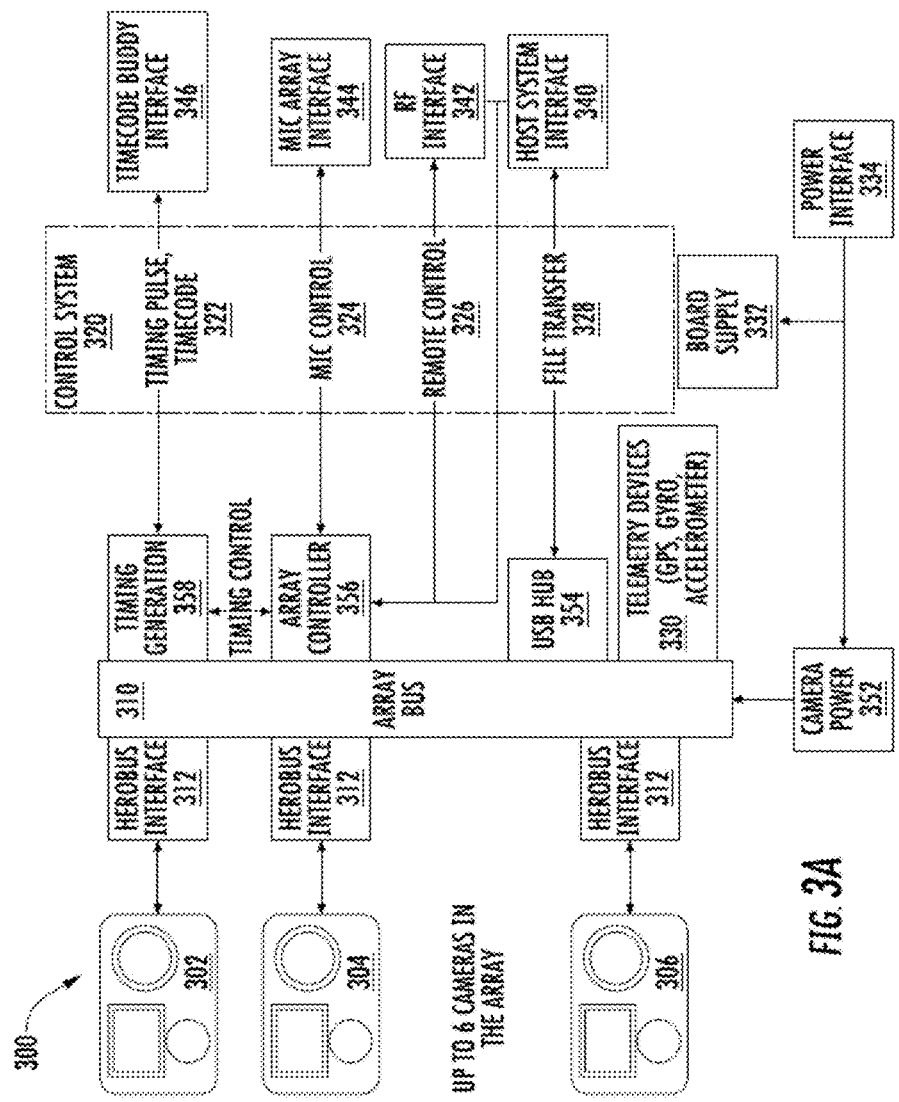
FIG. 3A is a functional block diagram illustrating an exemplary multi-camera system configured for wide angle image acquisition in accordance with one implementation.
Figure 4:
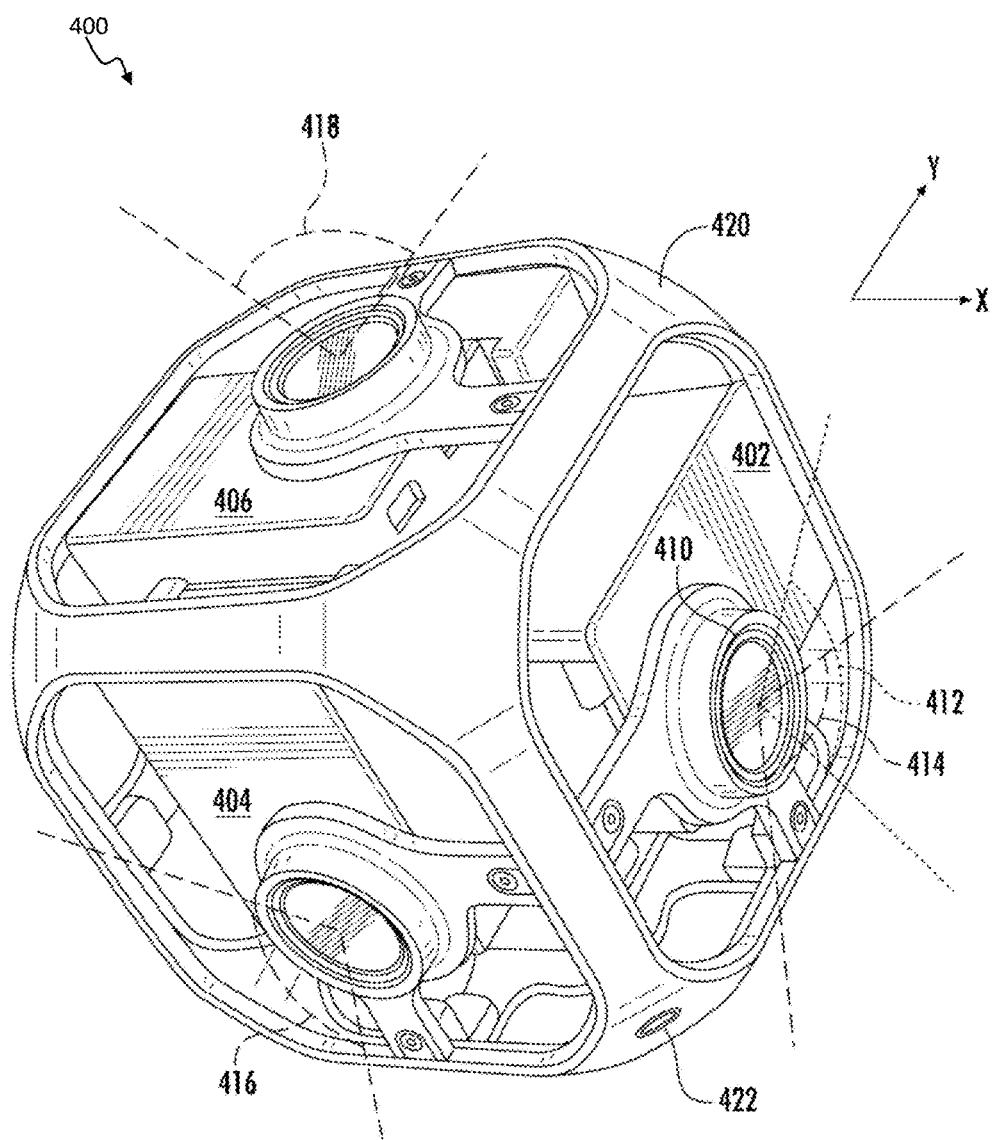
FIG. 4 is graphical illustration depicting an exemplary 6-camera imaging system in cube-shaped cage in accordance with one implementation.

FIG. 3A illustrates an exemplary multi-camera system configured for wide angle image acquisition in accordance with one implementation. The system 300 may comprise two or more capture devices, e.g., devices 302, 304, 306 in FIG. 3A. Individual capture devices (e.g., 302) may comprise a video camera device, such as described in, e.g., U.S. Provisional Patent Application Ser. No. 62/166,584, entitled "MULTI CAMERA MOUNT" filed on 26 May, 2015, the foregoing being incorporated herein by reference in its entirety. Individual capture devices may comprise an image sensor (e.g., CMOS sensor) characterized by a dimension and a resolution (in pixels). In some implementations, image sensor resolution may be configured between 4096 pixels by 2160 pixels and 848×480 pixels. Image refresh rate (e.g., frame rate) may be selected between 240 fps and 0.1 fps. It will be appreciated by those skilled in the arts that the above numbers are exemplary and various image resolution and/or refresh parameters may be utilized, e.g., 4 k (3840 pixel by 2160 pixel) images refreshed at 25 fps, 30 fps, 2.7 k (2716 pixel by 1524 pixel) at 25 fps, 30 fps, 60 fps, 1920 pixel by 1440 pixel refreshed at 25, 30, 50, 60, 80 fps, 1920×1080 at 120/90/60/30 fps, 1280×960 at 50, 60, 100, 12060 fps, 1280×720 at 240/120/60/30 fps and/or other configurations. Individual capture devices (e.g., 302, 304, 306) may be characterized by a given field of view. Capture devices may be arranged in a variety of spatial configurations, (e.g., in a given plane such as shown in FIG. 4 of U.S. Provisional Patent Application Ser. No. 62/166,584, entitled "MULTI CAMERA MOUNT" filed on 26 May, 2015, incorporated supra), multiple planes, e.g., as illustrated in FIG. 4, below), and/or other capture devices spatial configurations.

The system 300 may comprise an array bus component 310 configured to couple individual cameras 302, 304, 306 to a control component 320. In some implementation, the bus component 330 may comprise one or more bus interfaces 312 implemented using HERObus protocol, e.g., such as described in U.S. patent application Ser. No. 14/885,990, entitled "CONFIGURABLE INPUT/OUTPUT CONNECTOR IN A CAMERA", filed 16 Oct. 2015, the foregoing being incorporated herein by reference in its entirety.

The system 300 may comprise telemetry component 330. The component 330 may comprise one or more sensors and/or sensor interfaces configured to provide information related to image acquisition by the system 300. In some implementations, the telemetry component 330 may include an inertial measurement unit comprising an acceleration sensor and/or rate of rotation sensor, global positioning system (GPS) receiver component (not shown). LiDAR sensor, structured light sensor, and/or other sensor component. In one or more implementations, telemetry component 330 may comprise an interface to an external sensor (e.g., heart rate monitor, cadence sensor, and/or other sensor). In some implementations, the telemetry component may comprise a Micro-electro-mechanical systems (MEMS) solid state gyroscope configured to provide three components (x,y,z) of rate of rotation and three components (x,y,z) of acceleration information.

Telemetry component 330 may provide data related to position and/or orientation of the system 300 during image acquisition. In some implementation, orientation information may be provided at a rate selected between 10 Hz and 10,000 Hz in order to facilitate rolling shutter correction. In some implementations, wherein orientation information may be available at time intervals that may be greater than the row acquisition and transfer time interval (e.g., as described with respect to FIG. 1 and/or Eqn. 3) an interpolation process may be applied to the orientation information in order to obtain orientation corresponding to the row acquisition time instant. The interpolation process may include selection of a closest in time value, linear interpolation, quadratic interpolation and/or other method.

The system 300 may comprise a plurality of interface components, such as time code interface 346, microphone array interface 344, radio frequency (RF) interface, 342, a USB hub 354 and a host system interface 340. The time code interface may be configured to set system time from a known source of time, e.g., mobile application, desktop computer, GPS receiver, a GoPro BacPac device, a network entity, the Internet, and/or another source. In some implementations, the component 346 may be adapted to provide a timing indication 322 (e.g., a signal alternating between two logic levels, e.g., zero and one) configured to enable synchronous image capture by two or more capture devices (e.g., 302, 304, 306). The RF interface 342 may be configured to communicate one or more remote control instructions to the camera array via the array controller 356. In some implementations, the remote control commands may include on, off, start capture, pause capture, change image resolution, change image frame rate, highlight tag, and/or other indications.

The microphone array interface 344 may be configure to communicate information related to audio signal acquisition by the system 300. In one or more implementations, audio may be captured and/or encoded independently by individual capture device (e.g., 302, 304, 306). In some implementation the component 344 may interface to and/or provide audio input from one or more external microphones into the system 300. When external microphones may be used, the component 344 may communicate synchronization information configured to enable audio-video synchronization and/or audio synchronization between external and internal (e.g., built into the capture device 302, 304, 306) audio sources.

The host system interface 340 and the USB hub 354 may enable interface and/or data communication between an external entity (e.g., desktop, tablet, laptop computer, a smartphone, USB hub, and/or another computing device) and one or more capture device (302, 304, 306). The host system interface 340 and the USB hub 354 may enable offload of content captured by one or more capture devices USB when connected to an external USB hub and/or computer. In some implementations, captured content may be offloaded via removal of the SD cards from one or more capture device(s).

The system 300 may comprise a system control component 320 configured to communicate timing information 322 microphone control information 324, remote control information 326, and/or file transfer information 328 between respective interface components 346, 344, 342, 340 and the array controller 356, array timing 358, and/or USB hub, respectively. In some implementations, the control component 320 may comprise a printed circuit board, an FPGA, an ASIC, a SOC and/or other component.

The system 300 may further include power interface 334 coupled to power component 352 and the board supply component 332. In some implementations, the power component 352 may comprise energy source configured to provide power to one or more components of the system 300 (e.g., capture devices 302, 304, 306 via, e.g., bus interface 312, control component 320 and/or other components. The energy source may comprise any applicable source including but not limited to a direct current, an alternating current source, Da mechanical coupling, energy accumulator (ethical capacitor) and/or mechanical (e.g., a flywheel, a wind-up module), wireless charger, radioisotope thermoelectric generator, thermocouple, piezo-generator, a dynamo generator, a fuel cell, an internal or external combustion engine, a pneumatic, a hydraulic, and/or other energy source. In some implementations wherein the component 352 may comprise a rechargeable energy source (e.g., Switronix Hypercore-98S rechargeable 12 V battery component, 6.6 Ah, 14.8 V 98 Wh), the battery may be recharged from an external source via the interface 334. In one or more implementations, the system 300 may include energy management component configured to, implement a battery "spoofing" function so that the component 352 battery may be used for extended run-time. "Spoof" in this context may means running the camera array from the external power source without drawing power from the batteries of individual capture devices 302, 304, 306.

Figure 3B:
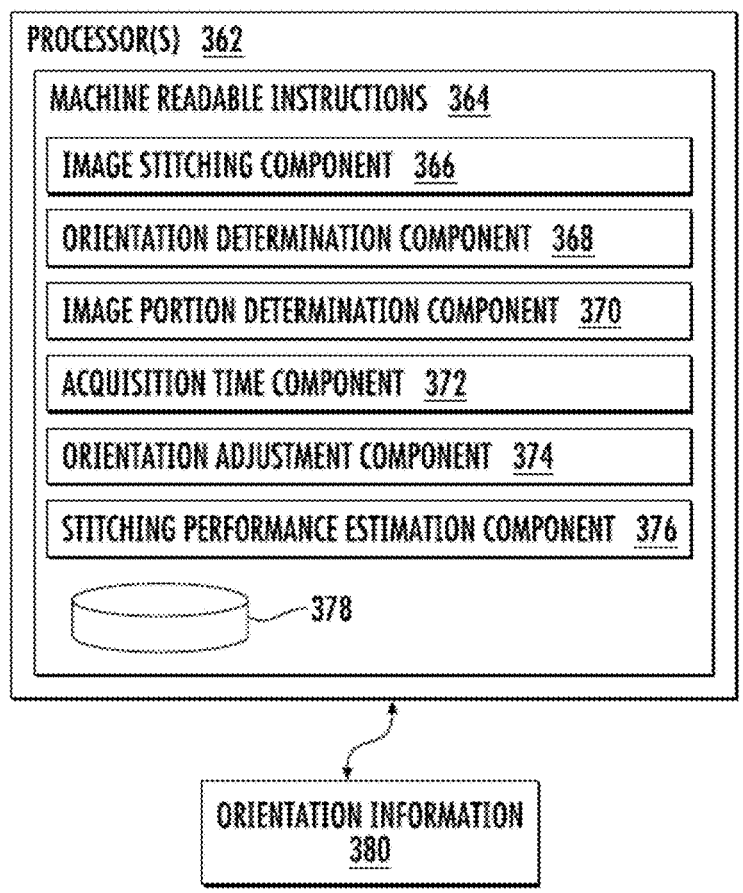
FIG. 3B is a functional block diagram illustrating an exemplary system configured for implementing rolling shutter correction methodology for obtaining a composite image in accordance with one implementation.

FIG. 3B illustrates an exemplary system configured for implementing rolling shutter correction methodology for obtaining composite images in accordance with one implementation of the present disclosure. The system 360 may comprise one or more physical processors 362 configured by machine-readable instructions 364 and/or other components. The processor component 362 may comprise one or more of a CPU, DSP, GPU, ASIC, SoC, FPGA, and/or other processing components. The processor 362 may be embodied within a camera system (e.g., 300 in FIG. 3A), mobile device (e.g., smartphone), a computer (e.g., laptop, desktop, tablet, and/or other computer), embedded computer, a server, and/or other computing platform. In some implementations, the processor component 362 may be effectuated using a cloud computing service (e.g., Amazon elastic computing cloud EC2) and/or other computing service.

Executing the machine-readable instructions 364 may cause the one or more physical processors 362 implement rolling shutter methodology of the disclosure. The machine-readable instructions 364 may include one or more of a transformation component 366 (abbreviated image stitching component 366 in FIG. 3B), orientation determination component 368, image portion location determination component 370 in FIG. 3B, image portion acquisition time instant determination component 372 (abbreviated acquisition time component 372 in FIG. 3B), sensor orientation determination component (abbreviated orientation adjustment component 374 in FIG. 3B), image stitching performance estimation component) (abbreviated stitching performance estimation component 376 component in FIG. 3B).

The system 360 may comprise an electronic storage component 378. The component 378 may comprise any applicable storage medium (e.g., optical, magnetic, flash memory, RAM, ROM, and/or other storage technology. In some implementations, e.g., such as shown and described with respect to FIGS. 3A, 4 and/or 5, the storage component 378 may comprise multiple physical storage elements (e.g., flash memory of individual capture devices 302, 304, 306). The component 378 may be configured to store multiple source images and/or transformed images.

One or more features and/or functions of system 360 may be configured to facilitate generation, editing, and/or distribution of videos comprised of one or more composite images. It is noted that although the present disclosure is directed to videos and/or video clips, one or more other implementations of system 360 may be configured for other types of information. By way of non-limiting example, other types of information items may include one or more of image filed obtained using pressure waves (e.g., ultrasonic imaging, geophysical imaging), x-ray imaging, magnetic resonance imaging, and/or other applications wherein two or more digital images may be combined to produce a composite image.

The transformation component 366 may be configured to implement image combination and/or image transformation operations to obtain a composite (panoramic) image, e.g., as shown in panel 520. In some implementations, operations to obtain a composite image may be implemented using methodology described e.g., with respect to FIG. 6 and/or PCT patent application PCT/EP2014/057352, entitled "FUSION OF A PLURALITY OF VIDEO STREAMS", filed 11 Apr. 2014, and/or PCT/EP2014/061897, entitled "MERGING OF A PLURALITY OF VIDEO FLOWS", filed 6 Jun. 2014

The orientation determination component 368, may be configured to obtain information related to orientation of a capture device, e.g., orientation of the camera apparatus 400 in FIG. 4. In some implementations, the component 368 may correspond to a component 330 described above.

The image element location determination component 370 may be configured to implement operations to determine location(s) within one or more source images corresponding to a given portion of the composite image. In some implementations wherein a first and a second source images may be combined to produce a composite image, the component 370 may be configured to determine a row in the first (and/or the second) source image they may correspond to a pixel within the composite image, e.g., as described with respect to FIG. 6.

The image row acquisition time instant determination component 372 may be configured to determine time of acquisition by a sensor of the source image location provided by the component 370. In some implementations, wherein the location may correspond to a first row within the first source image and/or a second row within the second source image, the component 372 may be configured to determine time of the first row and/or the second row acquisition by the first and/or the second image sensor, respectively. In some implementation, operation of the component 372 may include operations described with respect to FIG. 6.

The sensor orientation determination component 374 may be configured to produce orientation of an image sensor at a point in time when a given portion of a source image was acquired. In some implementation, the sensor orientation operation may comprise operations described with respect to FIG. 6 and/or Eqn. 3.

Image stitching performance estimation component 376 may be configured to provide an estimate of stitching performance when two or more source images may be combined to produce a panoramic image. In some implementation, operation of the component 376 may include operations described with respect to FIG. 6.

FIG. 4 depicts an exemplary 6-camera imaging apparatus in cube-shaped cage in accordance with one implementation. The cage 420 dimensions may be selected between 25 mm and 150 mm, preferably 105 mm in some implementations. The cage 420 may be outfitted with a mounting port 422 configured to enable attachment of the camera to a supporting structure (e.g., tripod, photo stick). The apparatus 400 may comprise six capture devices, e.g., cameras 402, 404, 406 visible in FIG. 4. Individual capture devices (e.g., 402) may comprise a video camera device, such as described in, e.g., such as described in U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety.

Individual cameras (e.g., 402, 404, 406) may be disposed in a rigid structure, e.g., cube-shaped cage 420 shown in FIG. 4. Use of a rigid structure may ensure that orientation of individual cameras with respect to one another may remain at a given configuration during operation of the apparatus 400.

Individual cameras (e.g., 402, 404, 406) may be characterized by field of view 120° in longitudinal dimension (e.g., dimension denoted by arrow 412) and 90° in latitudinal dimension (e.g., dimension denoted by arrow 414). In order to provide for an increased overlap between images obtained with adjacent cameras, image sensors of any two adjacent cameras may be configured at 90° with respect to one another. By way non-limiting illustration, longitudinal dimension 412 of camera 402 sensor may be oriented at 90° with respect to longitudinal dimension 416 of the camera 404 sensor; longitudinal dimension 418 of camera 406 sensor may be oriented at 90° with respect to longitudinal dimension 416 of the camera 404 sensor. Camera sensor configuration illustrated in FIG. 4, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Figure 5:
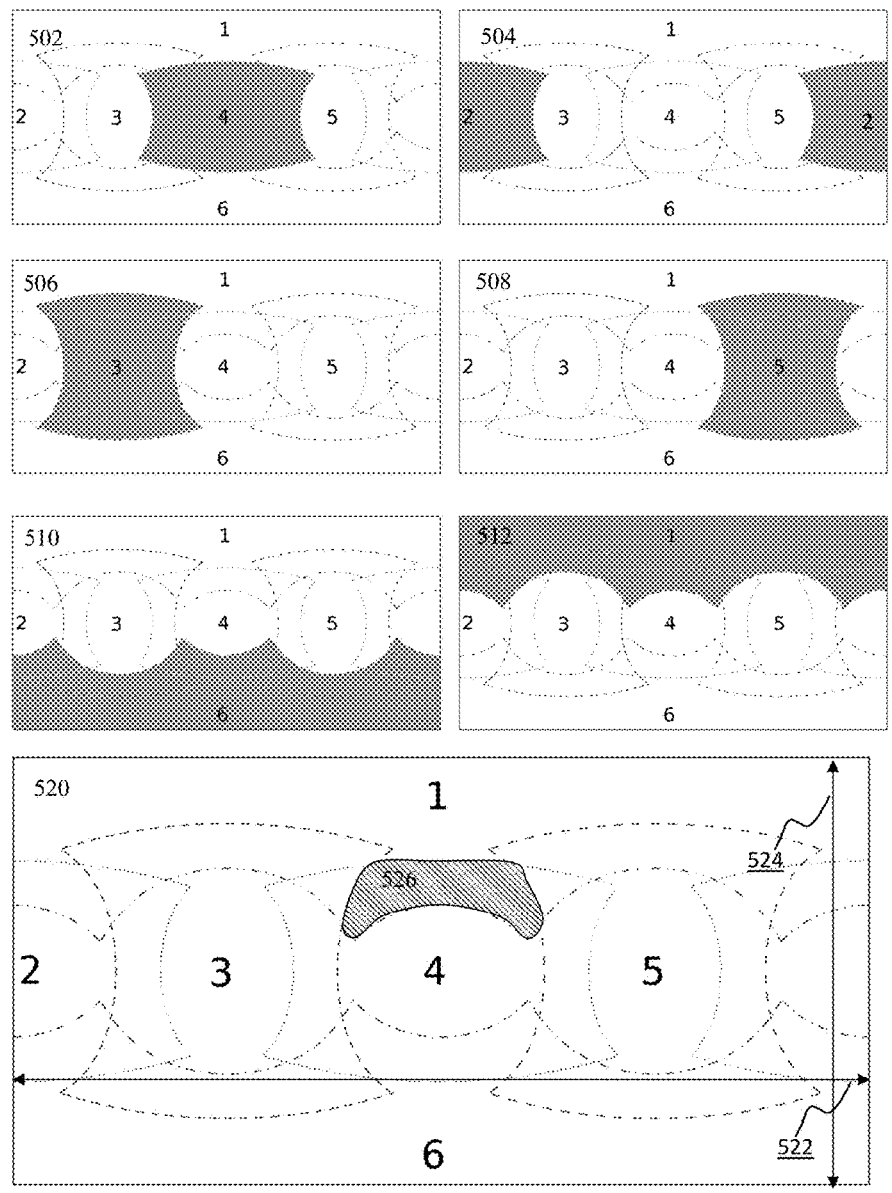
FIG. 5 is graphical illustration depicting exemplary overlapping fields of view of source camera projected onto the equirectangular space in accordance with one implementation.

Individual cameras of the system 400 may comprise a lens e.g., lens 410 of camera 402, characterized by what is referred to as fisheye pattern. Images captured by two or more individual cameras of the system 400 may be combined using stitching of fisheye projections of captured images to produce rectilinear plane image. FIG. 5 illustrates exemplary overlapping fields of view of source camera projected onto the equirectangular space in accordance with one implementation. Panels 502, 504, 506, 508, 510, 512 depict projections of field of views of individual cameras onto equirectangular plane. Panel 520 illustrates combined image comprising overlapping transformed images obtained by the six cameras. For a horizontally oriented system 400 (e.g., (XY) plane denoted by arrows 432 disposed horizontally), notation in FIG. 5 may be expressed as follows:

panel 502 may denote field of view 4 corresponding to a forward looking camera, e.g., camera 402 in FIG. 4;

panel 504 may denote field of view 2 of rearward looking camera;

panel 506 may denote field of view of leftward looking camera (field of view 3);

panel 508 may denote field of view 5 of rightward looking camera, e.g., camera 404 in FIG. 4;

panel 510 may denote field of view 1 of upward looking camera, e.g., 406 in FIG. 4; and panel 512 may denote field of view of downward looking camera (field of view 6).

In some implementations of obtaining spherical (also referred to as 360°) image and/or video content, the combined (composite) image (e.g., occupying rectangular area of panel 520) may be characterized by greater coverage of the visual scene (wider field of view) as compared to a given component (source) image (areas denoted by broken curves and labeled by numbers 1, 2, 3, 4, 5, 6 in panel 520). By way of an illustration, forward looking camera of the apparatus 400 may be characterized by field of view labeled 4 in panel 520 and may produce a component image that may cover 120° in horizontal plane and 90° in vertical plane. The combined image shown by the rectangle 520 may cover 360°×180° sphere. Dimensions of image in panel 520 may be characterized by a ratio of two to one (e.g., dimension 522 over dimension 524 in FIG. 5). In one or more implementations one or more of the component (source) images may be characterized by one or more image characteristic configured different from one or more of other source images. By way of a non-limiting illustration, one source image (e.g., an image of a person's face) may be characterized by greater resolution compared to another source image (e.g., image of a background). It will be recognized by those skilled in the arts that various other image characteristics may be configured for individual source images, including but not limited to lens aperture, exposure value, depth of focus, color content, image sharpness, saturation, white balance, field of view, resolution, image size, lens type (e.g., fisheye, rectilinear), and/or other parameter.

Figure 6:
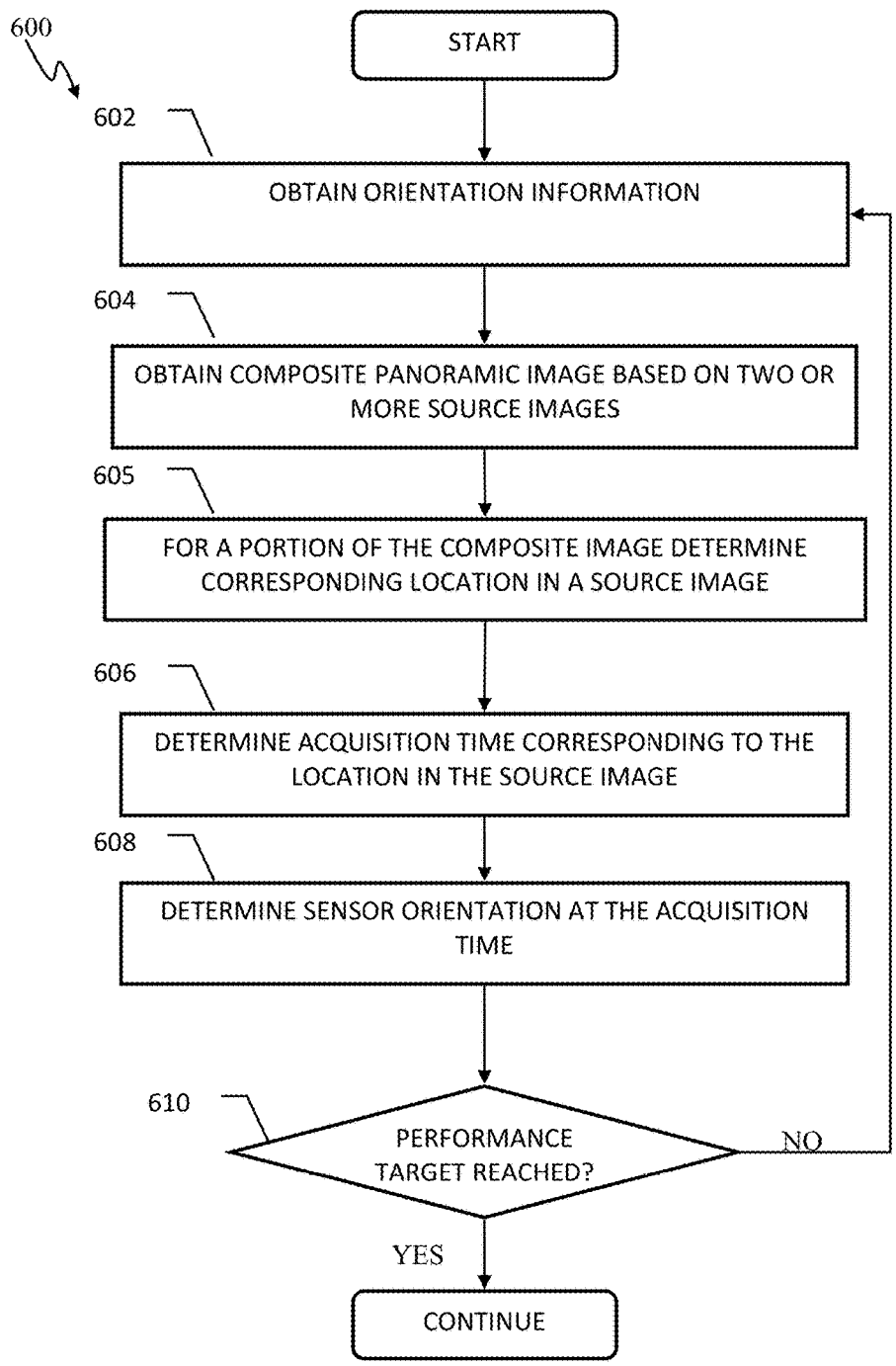
FIG. 6 is a logical flow diagram illustrating a method of rolling shutter correction based on sensor orientation adjustment/in accordance with some implementations.
Figure 7:
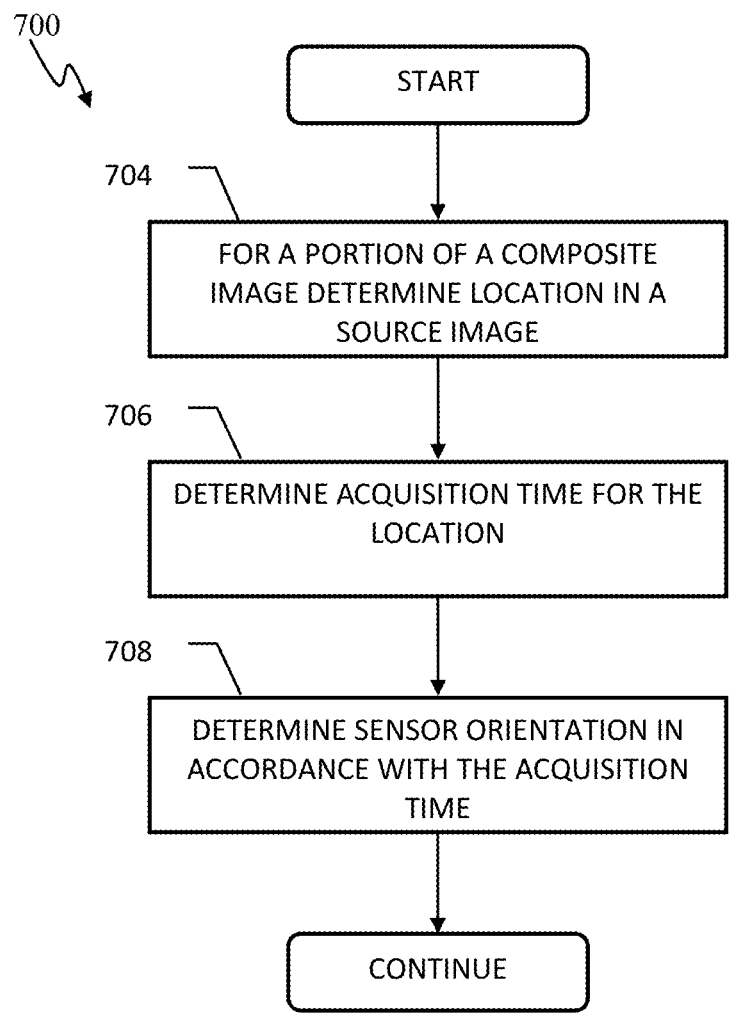
FIG. 7 is a logical flow diagram illustrating a generalized method of rolling shutter correction for a capture device system in accordance with one implementation.

FIGS. 6-7 illustrate exemplary methods 600, 700 for combining multiple images using timing correction methodology of the present disclosure. The operations of methods 600, 700 presented below are intended to be illustrative. In some implementations, method 600, 700 may be accomplished with one or more additional operations not described, and/or without one or more of the operations discussed. Additionally, the order in which the operations of method 600, 700 are illustrated in FIGS. 6-7 and described below is not intended to be limiting.

In some implementations, methods 600, 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700 in response to instructions stored electronically on an electronic storage medium. The one or more processing devices may include one or more devices configured through hardware, firmware, and/or software to be specifically designed for execution of one or more of the operations of methods 600, 700.

FIG. 6 is a logical flow diagram illustrating a method of rolling shutter correction based on sensor orientation adjustment in accordance with some implementations.

When using a rigid array of multiple cameras (e.g., such as shown and described with respect to FIG. 2 and/or FIG. 4, the an output image and/or video may be produced by projecting the source images onto the equirectangular space and combining projected images. Such combined image and/or video of images may be referred to as panoramic and/or wider angle of view image, as compared to one or more source images. In some implementations, a 360° video stream may be synthesized by projecting the source videos from 6 cameras (e.g., using apparatus 400 of FIG. 4) onto the equirectangular space (e.g., as shown by panel 530 in FIG. 5).

In order to improve alignment and/or matching of pixels between individual projections (e.g., 502, 504, 506, 508, 510, 512 in FIG. 5), pixels of individual source images may be time-aligned (synchronized) in order to reduce e.g., distortion due to parallax. As described above with respect to FIG. 1 and/or FIG. 2, when source images may be produced by a CMOS image sensor with image sampled row-at-a time, image row-level synchronization and/or timing corrections may be utilized. Such time-alignment may be referred to as rolling shutter correction. Rolling shutter corrections may reduce image pixel miss-alignment due to motion of the camera apparatus (e.g., 400 in FIG. 4) and produce higher quality stitching. Stitching quality may be characterized by, a measure configured base on determining a distance measure between one or more locations in the two or more source images (e.g., image 100, 110 in FIG. 1) as transformed into the combined panoramic image plane (e.g., the image shown in plane 520 in FIG. 5). In some implementations, the one or more locations may comprise coordinates of one or more control points selected using SIFT process. In some implementations, the control locations may be selected to lie within an region of overlap between the two or more source images in the transformed plane (e.g., region 526 in FIG. 5). In some implementations, the distance measure may be determined based on Root Mean Square (RMS) difference between pixel coordinates of the control points in the two or more source images.

In some implementations, wherein camera motion may be characterized by a rotational component (e.g., as depicted by arrow 208 in FIG. 2), the methodology illustrated and described with respect to FIG. 6 may be utilized to obtain image alignment.

At operation 602, orientation information may be obtained. Orientation determination operation 602 may be effectuated by component 368 of the system 360 of FIG. 3B.

In some implementations, the orientation information may comprise orientation of the camera apparatus as a function of time. The camera apparatus used for image acquisition may comprise an orientation component (e.g., telemetry component 330 of the system 300 and/or orientation component 366 of the system 360, accelerometer, gyroscope, and/or other sensor). In some implementations, the orientation component may be embodied within the camera apparatus and/or disposed external to the camera apparatus. Orientation information may be provided at a rate commensurate with the video frame rate (equal or greater). By way of an illustration, for video collected at 25 fps, camera orientation may be provided at 25 Hz or faster. In some implementations wherein the orientation component may comprise an IMU, the orientation information may be provided at a rate selected between 10 Hz and 10,000 Hz. In one or more implementations, camera orientation may be determined based on a reference orientation and camera rotation information. Camera rotation may be determined by analyzing contents of consecutive images obtained by a given camera sensor (e.g., sensor 202 in FIG. 2) using computer vision methods such as, e.g., key points extraction using a Scale-invariant feature transform (SIFT)-based detector/descriptor, pixel matching, rotation estimation using a random sample consensus (RANSAC) algorithm, and/or other methods.

At operation 604 of method 600, a composite panoramic image may be obtained based on a combination of two or more source images. Image combining operation 604 may be effectuated by component 366 of the system 360 of FIG. 3B Individual source images may be obtained with a camera apparatus comprising two or more image sensors (e.g., apparatus 200 of FIG. 2 and/or 400 of FIG. 4). In some implementations, operation 602 may comprise transformation of individual ones of the two or more source images onto equirectangular plane. The transformation may comprise an inverse of lens view field transformation pattern. By way of an illustration, if lens of the capture component (e.g., lens 410 of a capture component 402 in FIG. 4) may be characterized by a fisheye pattern, the source image transformation may be effectuated using an inverse of the fisheye transformation; if lens may be characterized by a rectilinear pattern, the source image transformation may be effectuated using an inverse of the rectilinear transformation, in one or more implementations.

The transformation of a given source image may be configured based on orientation R0 of the respective image sensor at time of the capture of the given source image. Individual sensors within the camera apparatus may be disposed at a given angle with respect to one another. FIG. 4 illustrates one exemplary implementation of a mounting structure (e.g., the cage structure 420). Image transformation may be expressed as follows:

$$I(\theta,\phi)=T[R0,I(x,y)] \quad \text{(Eqn. 1)}$$

wherein
I(x,y) may denote the source image;
I(θ, φ) may denote the composite (transformed) image;
R0 may denote image sensor orientation; and
T[ ] denotes camera projection transformation.

In Eqn. 1, image sensor orientation R0 may be obtained based on the camera mounting structure orientation information (e.g., orientation of the cage 420 as provided by an orientation sensor (e.g., an IMU)) and orientation of the image sensor within the mounting structure). In one or more implementations, camera rotation may be determined by analyzing contents of consecutive frames using computer vision methods such as, e.g., key points extraction using a Scale-invariant feature transform (SIFT)-based detector/descriptor, pixel matching, rotation estimation using a random sample consensus (RANSAC) algorithm, and/or other methods.

In some implementations wherein a camera lens may be characterized by a fisheye lens pattern, the projection transformation of Eqn. 1 may comprise fisheye transformation that may be expressed as follows:

$$u=r\ \sin(theta)\cos(phi)+0.5$$

$$v=r\ \sin(theta)\sin(phi)+0.5$$

where $$r=a\ \tan\ 2(\text{sqrt}(x*x+y*y),p\cdot z)/pi$$

$$phi=a\ \tan\ 2(y,x)$$

In one or more implementations, the transformation of Eqn. 1 may comprise a rectilinear transformation.

In some implementations, wherein an overlap between two or more source images may occur, a given pixel in the transformed image may correspond to two or more pixels within corresponding source images. By way of non-limiting illustration wherein an overlap between an image I1 and an image I2 may occur, a pixel p in ($\theta$, $\phi$) plane may correspond to pixel in the image I1 (p1(x1,y)) and pixel in the image I2 (p2(x2, y)). A combination of properties of pixel p1 and p2 may be determined in order to determine properties of the pixel p in the equirectangular space. The combination may comprise a color blend, an average, a weighted average, a median, a multiband blend, and/or another operation.

At operation 605, for a portion of the composite (transformed) image the corresponding location in the source image(s) may be determined. Location determination operation 605 may be effectuated by component 370 of the system 360 of FIG. 3B. In one or more implementations, the portion may comprise a pixel, a row/column of pixels, a polygon comprising multiple pixels, and/or another shape comprising multiple pixels. In some implementations, operations 605 may comprise determining, for a given pixel of coordinate ($\theta$, $\phi$) of the transformed image in the shutter-corrected transformed plan, the right color by picking the corresponding pixel of coordinate (x,y) in one of the source images. In one or more implementations, the location determination may comprise determining a corresponding row y in the source image for a given pixel of coordinate ($\theta$, $\phi$) in the shutter-corrected transformed plan. In order to determine orientation correction of pixel p at coordinate ($\theta$, $\phi$), camera orientation R(y) may be determined at the time of the capture of the pixel p($\theta$, $\phi$). As described in detail with respect to FIGS. 1-2, camera orientation may change from time when one row of source image may be sampled to time when another row may be sampled.

In some implementations, row location in the source image may be determined using fixed point iterations expressed as follow:

$$y_{n+1}=f(y_n),\ n=1,\ldots N \quad \text{(Eqn. 2)}$$

Number of iterations N may be selected between 3 and 11, in some implementations. In one or more implementations, number of iterations may be determined on a difference between coordinate $y_n$ of a given iteration and coordinate $y_{n-1}$ of a preceding iteration. Projection quality may be characterized by a projection error measure. In some implementations, an average distance between matched control points using SIFT-based key point detector may be utilized as the projection error measure. The SIFT control points extracted from the source images may be matched one another in order to find k nearest-neighbors for a given point. These control points may be used to determine an average distance measure for the transformed image.

During an initial iteration n=1, camera orientation R0 may be used in Eqn. 2 in order to obtain the image transformation. At a subsequent iteration n>1, a pixel ($\theta$, $\phi$) may be selected in the composite (transformed) image. A corresponding row $y_{n+1}$ of the source image(s) may be determined using formulation of Eqn. 2.

At operation 606 acquisition time corresponding to the location y produced at operation 605 may be determined. Acquisition time determination operation 606 may be effectuated by component 372 of the system 360 of FIG. 3B. Referring to FIG. 1, time of capture for a given row (e.g., 106 in FIG. 1) may be determined as $$t(y)=\text{exposure\_time}+\text{transfer\_time}*iy \quad \text{(Eqn. 3)}$$

where
  exposure_time may denote duration of sensor array exposure (duration of camera open shutter);
  iy may denote the row y index (e.g., between 0 and 3061 for a 12 megapixel image sensor); and
  transfer_time (also referred to as the acquisition time) may denote time associated with sampling of a row pixels by the image sensor.

In some implementations, image sensor (e.g., 212 in FIG. 2) may be configured to capture images using exposure duration configured different form exposure duration for another image sensor (e.g., 210 in FIG. 2). Exposure duration may be configured in accordance with a variety of parameters, image acquisition rate (frame rate), amount of light (ambient and/or flash), sensor sensitivity setting (e.g., ISO setting), sensor dimension, and/or other parameters. In some implementations, exposure time may be configured from the range between 1/500 of a second to 120 seconds. The row-to row acquisition time (transfer_time) parameter may be configured based on sensor pixel resolution, frame rate and may be selected between 2 microsecond (us) and 10,000 us, in some implementations. By way of an non-limiting illustration of capturing video containing images acquired at 48 fps and comprised of 1440 rows while allowing for 75% duty cycle, the row acquisition time (transfer_time) may be determined as follows:

$$\text{transfer\_time}=(1/48*0.75)/1440=0.00001085$$
$$s=10.85\ \text{us}.$$

Image sensor camera orientation R(y), at the time of capturing a given row of the image (row y), may depend on the camera rotation and the transfer time (the time between the capture of subsequent rows in the camera). In some implementations, the transfer time may be determined during camera manufacturing and/or testing. In one or more implementations, the transfer time may be estimated by minimizing the projection error of overlapping parts of two or more source images. The projection error may be determined based on a measured of an average distance between matched control points using a SIFT-based key point detector methodology.

At operation 608 sensor orientation at the acquisition time may be determined. Sensor orientation determination operation 606 may be effectuated by component 374 of the system 360 of FIG. 3B. The sensor orientation may be determined based on the acquisition time obtained at operation 606 and the orientation information obtained at operation 602. In some implementations, wherein multiple source images (obtained by multiple image sensors) may be combined to produce a composite image, operation 608 may comprise determining orientation of individual image sensor (e.g., sensor 202, 210 of FIG. 2) at a time the sensor has acquired a row of the source image corresponding to a pixel within the composite image. In some implementations, wherein the orientation information may be available at time intervals that may be greater than the row acquisition and transfer time interval (e.g., as described with respect to FIG. 1 and/or interval transfer_time in Eqn. 3) an interpolation process may be applied to the orientation information in order to obtain orientation corresponding to the row acquisition time instant. The interpolation process may include selection of a closest in time value, linear interpolation, quadratic interpolation and/or other method.

At operation 610 transformation performance may be determined. Transformation performance determination may be effectuated by component 376 of the system 360 of FIG. 3B. In some implementation, the performance evaluation may comprise determination of an average distance between matched control points in one or more source image and the transformed image, the points being determined using, e.g., SIFT-based key point detector. In some implementations, the determination of the above average distance may be employed in order to empirically determine the transfer_time parameter of Eqn. 3.

Responsive to determination at operation 610 that target performance of the transformation process has not been reached, the method 600 may proceed to operation 602, wherein the source images may be transformed using sensor orientation determined at operation 608.

Operations of method 600, comprising rolling shutter correction, may be performed one or more times (e.g., 5 times in some implementations) in order to obtain target performance of the transformation. Operations described with respect to FIG. 6 may enable one to obtain a composite (stitched) image (e.g., image in panel 520 of FIG. 5) characterized by greater stitching performance as compared to a stitched image obtained in absence of the rolling shutter corrections. In one or more implementation, stitching performance may be characterized by less visible boundaries between transforms of the two or more source images. Boundary visibility may be characterized by e.g., lower contrast between pixels within an area corresponding to transformation of one source image (e.g., area denoted 4 in panel 502) and another area corresponding to transformation of another source image (e.g., area denoted 3 in panel 506) in FIG. 5.

FIG. 7 illustrates a generalized method of rolling shutter correction for a capture device system in accordance with one implementation. The method may be utilized with a variety of capture devices, e.g., such as described in U.S. patent application Ser. No. 14/920,427 entitled "APPARATUS AND METHODS FOR EMBEDDING METADATA INTO VIDEO STREAM" filed on 22 Oct. 2015, incorporated supra, the multi-sensor apparatus 400 of FIG. 4, the system 300 described with respect to FIG. 3, and/or other implementation of a capture device.

At operation 704 of method 700, for a portion of a composite panoramic image, location parameter in a source image may be determined. The composite panoramic image may be obtained based on two or more source images, e.g., such as described above with respect to FIG. 5. The source image may correspond to an image obtained with a capture device, e.g., the image 100 in FIG. 1 and/or 402 in FIG. 4. In some implementations, the portion of the panoramic image may correspond to a pixel of multiple pixels; the location parameter may correspond to row of the source image (e.g., row 106 in FIG. 1) corresponding to the pixel location in the composite image containing the pixel.

At operation 706 acquisition time for the location obtained at operation 704 may be determined. In some implementations, wherein the location may comprise a row of pixels in the source image, the acquisition time may be determined based on the image exposure time and/or row transfer time, e.g., using Eqn. 3.

At operation 708 image sensor orientation corresponding to the acquisition time obtained at operation 706 may be determined. In some implementations, the orientation determination operation may comprise evaluation of a metadata track that may be associated with the video, determining orientation corresponding to the point in time of the acquisition time obtained at operation 706, the orientation information being provided by, e.g., an IMU component. In one or more implementations, camera orientation data may be combined with the video data into a multimedia container (e.g., MP4/MOV), e.g., as described in U.S. patent application Ser. No. 14/920,427, entitled "APPARATUS AND METHODS FOR EMBEDDING METADATA INTO VIDEO STREAM" filed on 22 Oct. 2015, incorporated supra. In one or more implementations, the orientation determination operation may comprise evaluation of orientation time series data provided by an orientation sensor, interpolation of the time series, and/or other operations.

Operations described with respect to FIG. 6 and/or FIG. 7 may provide for obtaining a composite image obtained with a moving camera and/or containing a moving object. In some implementations, methodology described herein may enable an improvement in quality of a composite (stitched) image (e.g., image in panel 520 of FIG. 5) characterized as compared to a stitched image obtained in absence of the rolling shutter corrections. In one or more implementation, stitching performance may be characterized by less visible boundaries between transforms of the two or more source images. Boundary visibility may be characterized by e.g., lower contrast between pixels within an area corresponding to transformation of one source image (e.g., area denoted 4 in panel 502) and another area corresponding to transformation of another source image (e.g., area denoted 3 in panel 506) in FIG. 5.

It will be recognized by those skilled in the arts that while certain aspects of the technology are described for images obtained by CMOS sensors, characterized by row-by-row image acquisition process, methodology described herein may be applicable to other sensor technologies and/or to other image configurations. By way of a non-limiting illustration, an image sensor device may comprise two or more components wherein the first image sensor component may sense incoming waves (e.g., light, radio frequency waves, pressure waves) at a first point in time, while the second image sensor component may sense the incoming waves at a second point in time, e.g., subsequent to the first point in time. For example, an image sensor may comprise two CCD components (e.g., one covering one (e.g., left) portion of a view field and one covering another (e.g., right) portion of the view) configured to acquire pixels at two points in time (e.g., first pixels of one CCD sensor and subsequently pixels of the other CCD). Methodology of the present disclosure may be used to combine component images provided by the two CCD sensors while accounting for potential sensor motion during acquisition of the component images.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-FI, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the technology. The scope of the disclosure should be determined with reference to the claims.

What is claimed:

1. A computerized system configured to obtain composite images, the system comprising:
   a processor adapted to execute a plurality of computer instructions; and
   non-transitory storage medium including the plurality of the computer instructions which, when executed by the processor, cause the processor to:
   obtain component images, the component images including a first component image comprised of a first plurality of pixels captured by a first imaging sensor and a second component image comprised of a second plurality of pixels captured by a second imaging sensor, the component images captured by the first imaging sensor and the second imaging sensor on a row-by-row basis, the row-by-row capture of the component images resulting in capture of individual rows of the component images at different acquisition times;

generate a first composite image by performing a first transformation operation on the component images;

for pixels in the first composite image, determine corresponding rows in the component images such that for a first set of pixels in the first composite image a first row of the first component image is determined to be corresponding, and for a second set of pixels in the first composite image a second row of the second component image is determined to be corresponding;

determine acquisition times of the component images associated with row locations corresponding to the pixels in the first composite image such that a first acquisition time is determined for the first row of the first component image and a second acquisition time is determined for the second row of the second component image;

determine orientations of the first imaging sensor and the second imaging sensor based on the acquisition times and orientation information of the first imaging sensor and the second imaging sensor such that a first orientation of the first imaging sensor is determined for capture of the first row of the first component image by the first imaging sensor based on the first acquisition time and a second orientation of the second imaging sensor is determined for capture of the second row of the second component image by the second sensor based on the second acquisition time; and perform a second transformation operation on the component images based on the first orientation of the first imaging sensor and the second orientation of the second imaging sensor to generate a second composite image such that the second transformation operation compensates for a difference between the first acquisition time of the first row of the first component image and the second acquisition time of the second row of the second component image and orientations of the first imaging sensor and the second image sensor during capture of the corresponding rows in the component images.

2. The system of claim 1, wherein the first composite image is characterized by a first performance metric and the second composite image is characterized by a second performance metric; and the second transformation operation is configured to improve the second performance metric relative the first performance metric.

3. The system of claim 1, wherein:

the first imaging sensor is configured to obtain the first component image at a first time instance; and the orientation information is obtained based on analysis of the first component image and a third component image obtained by the first imaging sensor at a second time instance prior to the first time instance.

4. The system of claim 1, further comprising: a sensor interface configured to obtain the orientation information.

5. The system of claim 4, wherein the sensor interface is configured to be coupled to an orientation sensor, the orientation sensor comprising one or more of a gyroscope and/or accelerometer.

6. The system of claim 1, further comprising:

a support structure configured to support the first imaging sensor, and to support the second imaging sensor at a given orientation relative to the first imaging sensor; and an orientation sensor configured to obtain an orientation of the support structure;

wherein the orientation information is configured based on an orientation of the first imaging sensor and an orientation of the second imaging sensor relative to the support structure, and the orientation of the support structure.

7. The system of claim 1, wherein:

determination of the corresponding rows in the component images is configured based on an iteration process such that for a given iteration, a first instance of the corresponding first row of the first component image is determined based on a second instance of the corresponding first row of the first component image determined at another iteration preceding the given iteration.

8. The system of claim 1, further comprising:

a first lens characterized by a first lens projection, the first lens configured to provide light waves to the first imaging sensor; and wherein the first transformation operation is configured based on an inverse of the first lens projection.

9. The system of claim 8, further comprising:

a second lens characterized by a second lens projection, the second lens configured to provide light waves to the second imaging sensor; and wherein the first transformation operation is further configured based on an inverse of the second lens projection.

10. The system of claim 9, wherein the first component image is configured based on the first lens projection and the first composite image is configured in an equirectangular projection; and the first transformation is configured to transform the first component image and the second component image into equirectangular plane.

11. The system of claim 10, wherein: the first lens projection is characterized by a rectilinear transformation.

12. The system of claim 10, wherein:

the first lens projection is characterized by a wide angle fish eye transformation such that a first lens field of view is characterized by a first cardinal dimension configured in excess of 120 degrees of arc and a second cardinal dimension configured in excess of 90 degrees of arc.

13. The system of claim 12, wherein:

the first imaging sensor is disposed in a plane configured perpendicular to plane of the second imaging sensor; and the second lens projection is configured based on the wide angle fish eye transformation such that a second lens field of view is characterized by the second cardinal dimension and the first cardinal dimension.

14. The system of claim 13, wherein the first lens field of view and the second lens field of view comprise an overlapping portion such that pixels of the first component image corresponding to the overlapping portion and pixels of the second component image corresponding to the overlapping portion are transformed into pixels of an overlapping area within the first composite image.

15. The system of claim 1, wherein the first imaging sensor comprises an array of rows of photosites configured based on a CMOS imaging process wherein time of acquiring content of a given row of photosites of the array is delayed relative to a time instance of acquiring content of another row of photosites of the array.

16. A computer implemented method of improving quality of a digital panorama image obtained based on stitching of source digital images, the method comprising:
   for a portion of the digital panorama image, determining a corresponding location in at least one of the source digital images, the at least one of the source digital images acquired by an image sensor on a location-by-location basis such that individual locations of the at least one of the source digital images are acquired at different acquisition times;
   determining an acquisition time at which the image sensor acquired the corresponding location in the at least one of the source digital images;
   determining an orientation of the image sensor during the acquisition time;
   performing a stitching operation configured to transform a portion of the at least one source digital image from a coordinate representation of the image sensor into a coordinate representation of the digital panorama image, the transform configured based on the orientation of the image sensor during the acquisition time to compensate for acquisition of the individual locations of the at least one of the source digital images are different acquisition times and the orientation of the image sensor;
   wherein
      the quality of the digital panorama image obtained based on the orientation of the image sensor is improved when compared to another quality of another digital panorama image obtained at a nominal sensor orientation.

17. The method of claim 16, wherein:
   the image sensor is configured to change its orientation during the acquisition of the at least one source digital image; and
   the nominal sensor orientation is maintained at a given orientation during the acquisition of the at least one source digital image.

18. The method of claim 16, wherein:
   the at least one source digital image includes multiple rows of pixels;
   the image sensor comprises a CMOS image sensor configured to acquire a given row of pixels of the multiple rows of pixels at a given time;
   the digital panorama image includes multiple pixels;
   the portion of the digital panorama image corresponds to at least one pixel of the multiple pixels;
   the portion of the at least one source digital image corresponds to a row of the multiple rows of pixels; and
   the corresponding location corresponds to an index of the row within the multiple rows of pixels of the at least one source digital image.

19. The method of claim 16, wherein the portion of the at least one source digital image is configured to be captured by the image sensor at a first time instance, and another portion of the source digital image is configured to be captured by the image sensor at a second time instance, the second time instance spaced by a delay interval from the first time instance, the delay interval is selected from a range between 5 microseconds and 1000 microseconds.

20. A non-transitory computer readable medium comprising a plurality of computer instructions configured to, when executed by a processor, produce a composite panoramic image in a panoramic image plane from first and second source images comprised of rows of pixels, the first and second source images captured on a row-by-row basis such that individual rows of the first and second source images are captured at different acquisition times, by at least:
   for a location in the panoramic image plane, determine corresponding rows in the first and second source images such that a corresponding first row of pixels in the first source image and a corresponding second row of pixels of the second source image are determined;
   determine acquisition times of the first and second source images associated with the corresponding rows such that a first acquisition time is determined for the first row of pixels in the first source image and a second acquisition time is determined for the second row pixels in the second source image;
   determine sensor orientations based on the acquisition times and orientation information such that a first sensor orientation is determined for a first sensor at the first acquisition time and a second sensor orientation is determined for a second sensor at on the second acquisition time; and
   perform a transformation operation on the first source image and the second source image based on the first sensor orientation and the second sensor orientation to obtain the composite panoramic image such that the transformation operation compensates for a difference between the first acquisition time of the first row of pixels in the first source image and the second acquisition time of the second row of pixels in the second source image and orientations of the first sensor and the second sensor during capture of the corresponding rows in the first and second source images.

* * * * *